United States Patent [19]

Nakamura et al.

[11] Patent Number: 4,613,643

[45] Date of Patent: Sep. 23, 1986

[54] POROUS SHEET

[75] Inventors: Shunichi Nakamura; Kenji Okamura, both of Tokuyama; Shingo Kaneko, Houfu; Kiyoshi Sumi, Tokuyama, all of Japan

[73] Assignee: Tokuyama Soda Kabushiki Kaisha, Yamaguchi, Japan

[21] Appl. No.: 578,763

[22] Filed: Feb. 9, 1984

[51] Int. Cl.$^4$ .................................................. C08K 3/00
[52] U.S. Cl. ........................................ 524/426; 264/41; 264/DIG. 47; 524/427; 524/448; 524/451; 524/456; 524/525; 524/528; 524/570; 524/574; 524/579
[58] Field of Search ............ 264/41, DIG. 47; 428/131, 136, 283; 524/584, 586, 574, 426, 427, 448, 451, 456, 525, 528, 570, 579

[56] References Cited

U.S. PATENT DOCUMENTS

| | | | |
|---|---|---|---|
| 3,649,611 | 3/1972 | Okumura et al. | 264/DIG. 47 |
| 3,843,761 | 10/1974 | Bierenbaum et al. | 264/41 |
| 3,880,966 | 4/1975 | Zimmerman et al. | 264/41 |
| 3,903,234 | 9/1975 | Ikeda et al. | 264/DIG. 47 |
| 4,024,213 | 5/1977 | Honda et al. | 264/11 |
| 4,138,459 | 2/1979 | Brazinsky | 264/DIG. 47 |
| 4,472,328 | 9/1984 | Sugimoto et al. | 264/41 |

Primary Examiner—James Lowe
Attorney, Agent, or Firm—Sherman and Shalloway

[57] ABSTRACT

A process for the preparation of soft porous sheets, comprises forming into a sheet a composition comprising (i) 40 to 80% by weight of an inorganic filler and (ii) 60 to 20% by weight of a polyolefin type thermoplastic elastomer composition comprising at least 50% by weight of a polyolefin type thermoplastic elastomer substantially free of a polar group, in which the tensile stress at a temperature of 25° C. under 100% stretching (100% modulus) is 10 to 100 Kg/cm$^2$, the elongation at break under stretching is at least 100% and the permanent strain under 100% stretching is less than 50% and up to 50% by weight of a thermoplastic plastomer, and stretching the sheet at a temperature lower than the softening temperature of the polyolefin type thermoplastic elastomer. A porous sheet obtained according to this process has a good combination of flexibility, air permeability and water resistance.

8 Claims, No Drawings

POROUS SHEET

This invention relates to a very soft porous sheet. More particularly, this invention provides a sheet having a structure in which an inorganic powder is dispersed in a matrix of a polyolefin type thermoplastic elastomer and fine pores are present between the inorganic powder and the matrix. Ordinarily, this sheet does not allow water to permeate therethrough because of the hydrophobic property of the polyolefin type thermoplastic elastomer and the pore size, but it has an air permeability. Furthermore, this sheet has a rubbery elasticity, and can be advantageously used for waterproof clothings, gloves, various waterproof covers, vessel materials, plaster bases and the like, singly or in combination with a fibrous or cloth-like reinforcing material mixed with or bonded to the sheet of this invention.

In accordance with this invention, there is provided a process for the preparation of soft porous sheets, which comprises forming into a sheet a composition comprising (i) 40 to 80% by weight of an inorganic filler and (ii) 60 to 20% by weight of a polyolefin type thermoplastic elastomer composition comprising at least 50% by weight of a polyolefin type thermoplastic elastomer substantially free of a polar group, in which the tensile stress at a temperature of 25° C. under 100% stretching (100% modulus) is 10 to 100 Kg/cm$^2$, the elongation at break under stretching is at least 100% and the permanent strain under 100% stretching is less than 50% and up to 50% by weight of a thermoplastic plastomer, and stretching the sheet at a temperature lower than the softening temperature of the polyolefin type thermoplastic elastomer.

As the conventional process for the production of porous sheets, there is known a process comprising incorporating an inorganic powder into a resin such as polypropylene or polyethylene, forming the composition into a sheet and stretching the sheet to form a porous sheet. A method for adding a small amount of a rubbery material to the resin in this known process has already been proposed. According to this conventional technique, since the resin forms the matrix of the sheet, the resin is elongated, oriented and set at the stretching step. Since the inorganic substance dispersed in the matrix is incapable of coping with the elongation of the resin, pores are formed on edges of particles of the inorganic substance.

The rubbery material dispersed in the resin exerts only an effect of increasing the impact strength of the resin sheet and makes no contribution to enhancement of the softness of the sheet as a whole.

Namely, according to the conventional technique, since the matrix of the sheet is composed of a resin and this resin is oriented and crystallized by stretching the hardness of the sheet is increased and the elasticity tends to decrease. The process of this invention is subtantially different from the conventional technique in the point where a sheet composed mainly of a polyolefin type thermoplastic elastomer is used.

Since an elastomer has a low elastic modulus at normal temperature and a high elastic recovery, it is ordinarily considered that even if a sheet comprising an inorganic powder dispersed in an elastomer as the matrix is stretched, because of the elasticity of the matrix, no porous structure can be formed. However, we found that when an inorganic powder is incorporated in a specific amount into a polyolefin type thermoplastic elastomer and a film formed from this composition is stretched at a stretching ratio of at least about 1.5, pores can be formed.

The polyolefin type thermoplastic elastomer used in this invention is substantially free of a polar group and is characterized in that the tensile stress at a temperature of 25° C. under 100% stretching (100% modulus) is 10 to 100 Kg/cm$^2$, the elongation at break under stretching is at least 100% and the permanent strain after 100% stretching is less than 50%. The polyolefin type thermoplastic elastomer composition used in this invention comprises at least 50% by weight of the above-mentioned polyolefin type thermoplastic elastomer, and up to 50% by weight of a thermoplastic plastomer (resin) may be incorporated according to need. It is sufficient if the polyolefin type thermoplastic elastomer forms a continuous phase.

In this case, the thermoplastomer is dispersed in the particulate form in the thermoplastic elastomer. Since it is important to attain a good dispersion state of the thermoplastic plastomer, in view of the compatibility between the thermoplastic elastomer and the thermoplastic plastomer, it is preferred that a polyolefin type resin be used as the thermoplastic plastomer. From another viewpoint, it is preferred that the resin to be dispersed in the thermoplastic elastomer should have a crystallinity, and a relatively highly crystalline resin of the polyolefin type is especially preferred. When the thermoplastic elastomer composition is melt-molded, crosslinking is caused by the affinity between the elastomer and the resin dispersed therein or by the action of a radical formed by kneading under heating, and the strength of the obtained sheet is further increased, the elastic recovery is increased and the heat resistance is improved.

In accordance withl another embodiment for effectively carrying out this invention, the polyolefin type thermoplastic elastomer or the polyolefin type thermoplastic elastomer composition is crosslinked. Crosslinking of the thermoplastic elastomer is accomplished by adding 0.01 to 2.0% by weight of a free radical initiator of the aromatic or aliphatic peroxide type decomposing at a temperature close to the melting temperature of the thermoplastic elastomer, for example, a peroxide such as dicumyl peroxide, 2,5-bis(t-butylperoxy)-2,5-dimethylhexyne or 1,1-bis(t-butylperoxyisopropyl)benzene, and kneading the composition by an ordinary kneading machine, for example, an open type roll, a closed Banbury mixer, a kneader or an extruder. The time at which crosslinking is effected is not particularly critical. For example, there may be adopted a method in which the thermoplastic elastomer composition is first crosslinked, the inorganic powder is then added and the composition is formed into a sheet, and a method in which the inorganic powder is first added and crosslinking is then carried out. The degree of crosslinking is ordinarily determined by extracting the crosslinked composition with a solvent such as p-xylene and examining the degree of partial gelation. In case of the polyolefin type thermoplastic elastomer or its composition according to this invention, the gel fraction of about 5 to about 60% is preferred, and it is preferred that the flowability be such that the melt flow index as measured at 230° C. is 0.1 to 50, especially 0.5 to 20.

As described hereinbefore, the polyolefin type thermoplastic elastomer used in this invention is substantially free of a polar group and is characterized in that the tensile stress at a temperature of 25° C. under 100% stretching (100% modulus) is 10 to 100 kg/cm², the elongation at break under stretching is at least 100% and the permanent strain after 100% stretching is less than 50%. When the polyolefin type thermoplastic elastomer has a polar group, even if the values of the above-mentioned physical properties are included within the ranges defined above, the intended effects of this invention cannot be attained. The reason has not been completely elucidated, but at the present, it is tentatively considered that the reason will probably be as follows.

When the polyolefin type thermoplastic elastomer has a polar group such as —OCOR (in which R stands for an alkyl group), —SO₂Cl, —COOR (in which R stands for an alkyl group), —COOH or —Cl, the elastomer shows an adhesiveness to the interface of the inorganic powder dispersed in the elastomer as the matrix, and because of this adhesiveness, the intended pores are hardly formed even by stretching, and at the same time, uneven stretching or breakage by stretching is readily caused.

Therefore, the polyolefin type thermoplastic elastomer used in this invention should be substantially free of a polar group bonded thereto. As preferred examples of the polyolefin type thermoplastic elastomer used in this invention, there can be mentioned in ethylene-propylene copolymer (EPR), an ethylene-propylene-diene copolymer (EPT), an ethylenebutene copolymer and a propylene-butene copolymer, each having the above-defined physical properties. A polyolefin type thermoplastic elastomer having a partially crystalline structure, that is, a crystallinity of 10 to 60%, is especially preferred.

In this invention, as pointed out hereinbefore, a thermoplastic synthetic resin (plastomer) may be mixed with the polyolefin type thermoplastic elastomer. From the viewpoint of the dispersibility in the polyolefin type thermoplastic elastomer, it is preferred that a polyolefin type resin such as a homopolymer of an olefin, for example, ethylene, propylene or butene or a copolymer thereof be used as the thermoplastic synthetic resin. The thermoplastic synthetic resin may be added in an amount of up to 50% by weight.

The kind of the inorganic powder which is incorporated as the inorganic filler into the polyolefin type thermoplastic elastomer composition is not particularly critical in this invention. Ordinarily, calcium carbonate, sodium carbonate, magnesium oxide, magnesium hydroxide, zeolite, aluminum hydroxide, titanium oxide, silicon oxide, talc, clay, diatomaceous earth, calcium sulfate, magnesium sulfate, sodium sulfate, calcium sulfite and magnesium sulfite are used. The particle size of the inorganic powder is ordinarily 0.01 to 20 microns, especially about 0.1 to about 5 microns.

In order to attain the effects of this invention sufficiently, it is preferred that the inorganic powder be incorporated in such an amount that the composition to be formed into a sheet comprises 40 to 80% by weight of the inorganic powder and 60 to 20% by weight of the polyolefin type thermoplastic elastomer composition. If the amount of the inorganic powder is smaller than 40% by weight, pores formed in the obtained sheet are insufficient and no satisfactory physical properties can be obtained. If the amount of the inorganic filler is larger than 80% by weight, control of stretching becomes difficult and satisfactory physical properties can hardly be obtained.

The method for mixing the inorganic powder with the polyolefin type thermoplastic elastomer composition is not particularly critical in this invention. Ordinarily, powders are mixed together by a blender or the like and the mixture is kneaded by an extruder, or powders are mixed and kneaded by a Banbury mixer or other melt-kneading machine. The kneaded composition is then formed into a sheet. If necessary, the composition is pelletized before formation of a sheet. In order to improve mechanical properties such as softness, elongation and elastic recovery and the moldability, various additives such as a mineral oil type softener, a non-polyolefin type elastomer, e.g., polybutadiene, a lubricant, e.g., calcium stearate, a pigment, a heat stabilizer, a light stabilizer, other stabilizer, a plasticizer and an antistatic agent may optionally be added at the mixing and kneading steps. The composition is formed into a sheet according to customary procedures.

Ordinarily, the composition is formed into a film by calender forming, press forming or extrusion forming, and extrusion forming using a circular die or T-die is especially preferred. The formed sheet is monoaxially or biaxially stretched at an area stretching ratio of 1.5 to 16 at a temperature lower than the softening temperature of the polyolefin type thermoplastic elastomer. After this stretching step, the stretched sheet is ordinarily cooled to a temperature lower than the stretching temperature, preferably room temperature, and the stretched sheet is withdrawn.

Through the above-mentioned steps of the process of this invention, there is obtained a porous sheet of the communicating cell type which is characterized in that the initial tensile elastic modulus in at least one of MD and TD directions at normal temperature is lower than 500 kg/cm², the elongation at break under stretching is at least 50% and the permanent strain after 50% stretching is less than 50% and which is flexible and has an average pore size of 0.05 to 5 microns, a maximum pore size smaller than 10 microns, a water pressure resistance of at least 1000 mmH₂O and an air permeability lower than 10000 sec/100 cc.

The air permeability and water resistance of the porous sheet of this invention are changed according to the number of pores in the porous sheet and the pore size (pore diameter).

The pore number and pore size can be controlled by adjusting the particle size of the inorganic filler used, the amount incorporated of the inorganic filler and the stretching ratio.

Namely, the number of pores in the porous sheet obtained by stretching is increased as the number of particles of the inorganic powder incorporated in the polyolefin type thermoplastic elastomer is increased, that is, fine particles are used in a large amount. As the particle size of the inorganic powder incorporated into the polyolefin type thermoplastic elastomer is large and the stretching ratio is high, a porous sheet having a large average particle size and a large maximum particle size is obtained.

As is apparent from the foregoing description, the porous sheet of this invention has the following characteristic properties.

The porous sheet has a maximum pore size smaller than 10 microns and an average pore size is 0.05 to 5 microns. Because of these pore size characteristics, the water pressure resistance is at least 1000 mmH₂O and the air permeability is lower than 1000 sec/100 cc. This porous sheet is excellent also in the moisture permeability. For example, the moisture permeability is at least 400 g/m²/24 hours as measured at a temperature of 25° C. and a relative humidity of 90%. Moreover, the porous sheet of this invention is rich in the flexibility. For example, there can be obtained a porous sheet in which the initial tensile elastic modulus is lower than 500 kg/cm², the permanent strain after 50% stretching is lower than 50%, and furthermore, the elongation at break by stretching is at least 50%.

When the porous sheet of this invention is examined by an electron microscope, it is seen that innumerable pores are present on the surface of the sheet, the inorganic powder is present in parts of these pores, the pores are relatively irregular in the shape and the pore shape can be changed from a circular shape to an ellipsoidal shape according to the stretching method. The pore shape in the porous sheet of this invention can clearly be distinguished from a relatively large spherical shape of pores of a formed sheet obtained by using a blowing agent, and the pores of the porous sheet of this invention are formed by stretching.

As pointed out hereinbefore, the porous sheet obtained according to this invention has especially an elastic recovery force and is flexible and excellent in the air permeability. Accordingly, for example, when the porous sheet of this invention is kept in contact with a human body for several hours, impermeation of air is not caused in the contact portion of the human body. Therefore, the porous sheet of this invention is valuably used as a waterproof clothing, a protecting material for an ointment or the like, a waterproof cover, a medical or sport supporter, a sanitary article or other material to be applied to a human body or a warm-blooded animal, without or after backing with a cloth, if the porous sheet has a thickness of about 0.05 to about 0.3 mm.

This invention will now be described in detail with reference to the following Examples that by no means limit the scope of the invention.

Incidentally, the physical properties mentioned in the Examples were determined according to the following methods.

(1) Tensile Strength (TS) and Elongation at Break (EB):

The tensile strength was measured at 25° C. at a tensile speed of 200 mm/min by using a dumbbell No. 1 in a tensile tester (Tensilon supplied by Toyo Baldwin), and was expressed by the strength per unit area (kg/mm²). The elongation at break was expressed by the elongation (%) at which the sample was broken.

(2) Initial Tensile Elastic Modulus:

The tensile test was carried out under the same conditions as described in (1) above, and the initial tensile elastic modulus was calculated from the gradient at the point of the start of stretching in an elongation-tensile stress curve.

(3) Permanent Strain:

In the same tester as used in (1) above, the sample was elongated by 50% between gages at a tensile speed of 100 mm/min by using a dumbbell No. 3, and this state was maintained for 10 minutes. The sample was taken out from the tester and allowed to stand for 10 minutes, and the recovered length between gages was measured and the permanent strain was calculated from the measured value according to the following formula:

$$\text{Permanent strain} = \frac{[\text{gage length after test}] - [\text{gage length before test (20 mm)}]}{[\text{gage length before test}]}$$

(4) Air Permeability:

According to the method of JIS P-8117 (1963), the time required for a cylinder having an area of 645.16 mm² and a weight of 567 g to allow permeation of 100 cc of air through the sample piece was measured, and the air permeability was expressed by the measured time (seconds).

(5) Maximum Pore Size (Dmax):

The sample sheet was impregnated with ethanol, and the maximum pore size was determined according to the method of ASTM F-316-70.

(6) Gel Fraction:

The gel fraction was determined by extracting the sample with p-xylene in Soxhlet's extractor while refluxing the solvent at the boiling point of p-xylene, and the gel fraction was expressed by the ratio of the unextracted portion to the resin.

(7) Melt Flow Index:

According to the method of ASTM D-1238-57, the melt flow index was expressed by the weight of the molten resin extruded at 230° C. under a load of 2160 g over a period of 10 minutes.

(8) Water Pressure Resistance:

The water pressure resistance was determined according to Federal Standard, 191, Method 5512. Namely, a sample sheet having a diameter of 3 cm was gripped, the water pressure was increased at a rate of 1 kg/cm²/min on one surface, and the pressure (mmH₂O) under which water leaked from the opposite surface was measured. The water pressure resistance was expressed by this water pressure.

(9) Average Pore Size:

A mercury pressure porosimeter (supplied by Carlo Erba Co., Ltd.) was used. Mercury was intruded into the sample under pressure, and the pore size distribution (D) was determined according to the following formula and the average pore size ($\overline{D}$) (microns) was expressed by the median value.

$$D \text{ (microns)} = \frac{7.5}{p}$$

wherein p stands for the pressure (kg/cm²).

(10) Porosity:

The porosity was calculated from the density of the sheet according to the following formula:

$$\text{Porosity (\%)} = \frac{\rho_o - \rho}{\rho_o} \times 100$$

wherein $\rho_o$ stands for the density (g/cm³) of the sheet before stretching and $\rho$ stands for the density (g/cm³) of the sheet after stretching.

EXAMPLES 1 THROUGH 3

A composition comprising 50 g of a resin mixture comprising an ethylene-butene-1 copolymer (PEB) (Tafmer A supplied by Mitsui Petrochemical; ethylene content=85%) in which the stress at 25° C. under 100% stetching (100% modulus) was 60 Kg/cm², the elongation at break was 70% and the permanent strain after 100% stretching was 5% and polypropylene (PP) (YE-130 supplied by Tokuyama Soda) having a melt flow index of 4.0, at a mixing ratio shown in Table 1, 50 g of heavy calcium carbonate (Whiton SB supplied by Shiraishi Calcium) having an average particle size of 1.7 microns and 2 g of a polyester type plasticizer (Polycizer W-2300 supplied by Dainippon Ink Chemicals) was melt-kneaded by a 3-inch roll heated at 190° C. for 10 minutes, and press-formed into a sheet having a thickness of 0.3 mm. The sheet was stretched at 60° C. at a stretching rate of 600 %/min by a bench-scale -biaxially stretching machine simultaneously in both the longitudinal direction and the lateral direction. The stretching ratio was 2 in each direction. The stretched sheet was cooled to 25° C. and taken out from the stretching machine.

The obtained stretched sheet was somewhat shrunken and the stretching ratio was reduced, but as shown in Table 1, the sheet had a low tensile elastic modulus, a high elongation and a large elastic recovery and the product was a porous sheet rich in the flexibility.

COMPARATIVE EXAMPLE 1

A stretched sheet was prepared in the same manner as described in Example 1 except that the ethylenebutene-1 copolymer/polypropylene weight ratio was changed to 45/55. As shown in Table 1, the obtained porous sheet had a low elongation and a small elastic recovery, and the sheet could not be regarded as a sheet rich in the flexibility.

COMPARATIVE EXAMPLE 2

A composition comprising 20 g of polypropylene (YE-130 supplied by Tokuyama Soda) having a melt flow index of 4, 30 g of liquid 1,2-polybutadiene (LPB) (Nisso-PB B-3000 supplied by Nippon Soda) and 50 g of the same heavy calcium carbonate as used in Example 1 was formed into a sheet and stretched at 120° C. in the same manner as described in Example 1. As shown in Table 1, the obtained sheet had a low elongation.

COMPARATIVE EXAMPLE 3

A sheet prepared from a composition comprising 50% by weight of a commercially available ethylenevinyl alcohol copolymer (Ultrathene UE 634 supplied by Tokuyama Soda; vinyl acetate content=25%) and 50% by weight of calcium carbonate as a filler was stretched at 50% in the same manner as described in Example 1. Breakage was caused when the stretching ratio was about 1.1. The reason is considered to be that when an ethylene-vinyl alcohol copolymer is used as the matrix, peeling in the interface between the matrix and calcium carbonate as the filler is difficult.

COMPARATIVE EXAMPLE 4

A composition comprising 50 g of an ethylenepropylene copolymer (Tafmer P-0280 supplied is Mitsui Petrochemical) in which the tensile stress at 25° C. under 100% stretching was 8 kg/cm$^2$, the elongation at break was 600% and the permanent strain after 100% stretching was 5%, 50 g of heavy calcium carbonate (Whiton B supplied by Shiraishi Calcium) having an average particle size of 3.3 microns and 2 g of a polyester type plasticizer (Polycizer W-2300 supplied by Dainippon Ink Chemicals) was melt-kneaded by a 3-inch roll heated at 150° C. for 10 minutes, and press-formed into a sheet having a thickness of 0.3 mm. The sheet was stretched at 40° C. by a bench-scale biaxially stretching machine in the same manner as described in Example 1. When the stretching ratio was about 1.2, the sheet was broken. The sheet was similarly broken even if the stretching temperature was lowered to 25° C. Since the copolymer used had a low tensile stress, stretching was extremely difficult.

COMPARATIVE EXAMPLE 5

A composition comprising 50 g of polybutene-1 (PB-1) (A.A. Poly Butene 1600 supplied by Shell Chemicals) in which the tensile stress at 25° C. under 100% stretching was 180 kg/cm$^2$, the elongation at break was 600% and the permanent strain after 100% stretching was 30%, 50 g of the same heavy calcium carbonate as used in Comparative Example 4 and 2 g of the same polyester plasticizer as used in Comparative Example 4 was melt-kneaded by a 3-inch roll heated at 180° C. for 10 minutes, and press-formed into a sheet having a thickness of 0.3 mm. The sheet was biaxially stretched at 80° C. at a stretching ratio of 2 in each direction by a bench-scale biaxially stretching machine in the same manner as described in Example 1, and the stretched sheet was cooled to 25° C. and taken out from the stretching machine. As shown in Table 1, the permanent strain was large, and the stretched sheet could not be regarded as a flexible sheet having a large elastic recovery.

TABLE 1

| | PEB/PP Weight Ratio | Content (% by weight) of Calcium Carbonate | Stretching Conditions ||| Properties of Stretched Sheet ||||
|---|---|---|---|---|---|---|---|---|---|
| | | | Temperature (°C.) | Set Stretching Ratio (area stretching ratio) | Actual Stretching Ratio (area stretching ratio) | Thickness (mm) | TS (kg/cm$^2$) | EB (%) | Initial Tensile Elastic Modulus (kg/cm$^2$) |
| Example 1 | 100/0 | 50 | 60 | 4.0 | 2.9 | 0.15 | 50 | 400 | 40 |
| Example 2 | 80/20 | 50 | 60 | 4.0 | 2.9 | 0.15 | 60 | 380 | 50 |
| Example 3 | 60/40 | 50 | 60 | 4.0 | 3.1 | 0.16 | 65 | 300 | 70 |
| Comparative Example 1 | 45/55 | 50 | 60 | 4.0 | 3.8 | 0.12 | 120 | 90 | 350 |
| Comparative Example 2 | PP/LPB = 20/30 | 50 | 120 | 4.0 | 3.9 | 0.13 | 70 | 40 | 220 |
| Comparative Example 5 | PB-1-pp = 50/0 | 50 | 80 | 4.0 | 3.7 | 0.14 | 90 | 110 | 350 |

| | Properties of Stretched Sheet ||||| 
|---|---|---|---|---|---|
| | Permanent Strain % | Porosity (%) | Air Permeability (sec/100 cc) | Dmax (μ) | Water Pressure Resistance (mm H$_2$O) |
| Example 1 | 10 | 43 | 160 | 3.0 | 5000 |
| Example 2 | 15 | 48 | 110 | 3.3 | 4600 |
| Example 3 | 15 | 51 | 70 | 3.5 | 4500 |
| Comparative Example 1 | 80 | 57 | 120 | 3.3 | 4600 |

TABLE 1-continued

| | | | | | |
|---|---|---|---|---|---|
| Comparative Example 2 | measurement impossible because of breakage | — | — | — | — |
| Comparative Example 5 | 70 | 46 | 1500 | 1.2 | 8900 |

EXAMPLE 4

A composition comprising 35 g of an ethylenepropylene-diene copolymer (EPDM) (JSR EP57P supplied by Japanese Synthetic Rubber; third component=ethylidene norbornene) in which the tensile stress at 25° C. under 100% stretching was 15 kg/cm$^2$, the elongation at break was 1000% and the permanent strain after 100% stretching was 10%, 15 g of powdery polypropylene (YE-130 supplied by Tokuyama Soda) having a melt flow index of 4 and 50 g of heavy calcium carbonate (Whiton SB supplied by Shiraishi Calcium) having an average particle size of 1.7 microns was charged in a small-size Banbury mixer, kneaded at 190° C. for 10 minutes and press-formed at 200° C. into a sheet having a thickness of 0.3 mm. The sheet was monoaxially stretched at 50° C. in the same manner as described in Example 1. The stretching ratio was set at 2. When the stretched sheet was cooled and taken out, the sheet was somewhat shrunken. As shown in Table 2, the obtained stretched sheet was an air-permeable sheet excellent in the flexibility and elastic recovery.

EXAMPLES 5 THROUGH 7

The same composition as used in Example 4 was charged in a small-size Banbury mixer and kneaded at 190° C. for 5 minutes. Then, 0.4 g of 2,5-dimethyl-2,5-di-(t-butylperoxy)hexyne-3 (Kayahexa YD supplied by Kayaku Noury) was added as a crosslinking agent, and the composition was further kneaded for 5 minutes. Then, 1 g of 2,4-di-t-butylcresol (BHT) was added and the composition was press-formed at 200° C. into a sheet having a thickness of 0.30 mm. When the sheet was subjected to extraction with p-xylene in Soxhlet's extractor, the extraction residue corresponded to a gel ratio of 10.4% based on the resin. The melt flow index of the composition in the form of the sheet was 0.5 as measured at 230° C.

The sheet was subjected to sequential biaxial stretching at 80° C. at a stretching ratio shown in Table 2. Incidentally, the stretching ratio in the longitudinal direction was the same as the stretching ratio in the lateral direction. The stretched sheet was cooled and taken out. A flexible porous sheet having a good elastic recovery, as shown in Table 2, was obtained.

In each of Examples 5 through 7, since the resin matrix was partially crosslinked, stretching could be performed very smoothly, and the obtained porous sheet was excellent in the flexibility, elongation and elastic recovery.

TABLE 2

| | | | | Stretching Conditions | | Properties of Stretched Sheet | | |
|---|---|---|---|---|---|---|---|---|
| | EPDM/PP Weight Ratio | Peroxide (PHC)* | Content (% by weight) of Calcium Carbonate | Temperature (°C.) | Set Stretching Ratio (area stretching ratio) | Actual Stretching Ratio (area stretching ratio) | Thickness (mm) | TS (kg/cm$^2$) | EB (%) |
| Example 4 | 35/15 | 0 | 50 | 50 | 2.0 | 1.5 (1.7 × 0.9) | 0.23 | 130 (MD) 40 (TD) | 100 (MD) 300 (TD) |
| Example 5 | 35/15 | 0.4 | 50 | 80 | 2.0 | 1.6 | 0.23 | 60 | 340 |
| Example 6 | 35/15 | 0.4 | 50 | 80 | 4.0 | 2.9 | 0.16 | 50 | 250 |
| Example 7 | 35/15 | 0.4 | 50 | 80 | 9.0 | 6.0 | 0.09 | 30 | 100 |

| | Properties of Stretched Sheet | | | | | |
|---|---|---|---|---|---|---|
| | Initial Tensile Elastic Modulus (kg/cm$^2$) | Permanent Strain (%) | Porosity (%) | Air Permeability (sec/100 cc) | Dmax (μ) | Water Pressure Resistance (mm H$_2$O) |
| Example 4 | 160 (MD) 60 (TD) | 40 (MD) 50 (TD) | 19 | 5000 | <0.5 | 18000 |
| Example 5 | 110 | 10 | 34 | 1200 | 1.3 | 8800 |
| Example 6 | 80 | 15 | 45 | 450 | 2.4 | 5700 |
| Example 7 | 210 | 30 | 53 | 230 | 3.0 | 5000 |

*PHC: gram added per 100 g of (EPDM/PP + calcium carbonate)

EXAMPLES 8 THROUGH 10

A sheet was prepared by performing kneading and press-forming in the same manner as described in Example 1 except that a commercially available polyolefin type thermoplastic elastomer composition (Milastmer 8530 supplied by Mitsui Petrochemical; PP content=30%) in which the tensile stress at 25% under 100% stretching was 50 kg/cm$^2$, the elongation at break was 620% and the permanent strain after 100% stretching was 25% and polypropylene (ME 240 supplied by Tokuyama Soda) having a melt flow index of 9 were used at a weight ratio of 4/1 and heavy calcium carbonate (Whiton B supplied by Shiraishi Calcium) having a particle size of 3.3 microns was incorporated as a filler in an amount shown in Table 3.

By using a small-size stretching machine, the obtained sheet was subjected to sequential biaxial stretching at 25° C. The stretching ratio in the longitudinal direction was the same as the stretching ratio in the lateral direction. The stretched sheet was cooled to 25° C. and taken out from the stretching machine.

The obtained stretched sheet was a porous sheet having good flexibility, elongation and elastic recovery if the amount of the filler was in the range of from 40 to 80% by weight.

If the amount of the filler was smaller than 40% by weight, the air permeability was inferior and communicating pores were not formed. If the amount of the filler exceeded 80% by weight, stretching became difficult and breakage was caused at a stretching ratio lower than 1.5.

a roll temperature of 60° C. The stretched sheet was wound under cooling. The length (width) of the stretched sheet in the lateral direction (TD) was slightly smaller than that of the unstretched sheet. In Table 4, the substantial area stretching ratio (MD×TD) is shown.

TABLE 3

| | Milastmer/PP Weight Ratio | Content (%) by weight) of Calcium Carbonate | Stretching Conditions | | Properties of Stretched Sheet | | | |
|---|---|---|---|---|---|---|---|---|
| | | | Temperature (°C.) | Set Stretching Ratio (area stretching ratio) | Actual Stretching Ratio (area stretching ratio) | Thickness (mm) | TS (kg/cm$^2$) | EB (%) | Initial Tensile Elastic Modulus (kg/cm$^2$) |
| Example 8 | 48/12 | 40 | 120 | 4.0 | 2.7 | 0.17 | 80 | 380 | 110 |
| Example 9 | 32/8 | 60 | 120 | 4.0 | 2.9 | 0.15 | 50 | 260 | 70 |
| Example 10 | 20/5 | 75 | 120 | 2.0 | 1.5 | 0.23 | 40 | 110 | 50 |

| | Permanent Strain (%) | Porosity (%) | Air Permeability (sec/100 cc) | Dmax (μ) | Water Pressure Resistance (mm H$_2$O) |
|---|---|---|---|---|---|
| Example 8 | 15 | 34 | 1500 | 1.3 | 8800 |
| Example 9 | 13 | 47 | 150 | 4.3 | 3800 |
| Example 10 | 10 | 54 | 80 | 4.5 | 3600 |

EXAMPLES 11 THROUGH 14

TABLE 4

| | PEB/LLDPE Weight Ratio | Content (% by weight) of Inorganic Filler | Stretching Conditions | | | Properties of Stretched Sheet | | |
|---|---|---|---|---|---|---|---|---|
| | | | Temperature (°C.) | Set Stretching Ratio (area stretching) (MD × TD) | Actual Stretching Ratio (area stretching ratio) (MD × TD) | Thickness (mm) | TS (kg/cm$^2$) | EB (%) |
| Example 11 | 25/15 | 60 (calcium carbonate) | 60 | 3 × 1 | 2.5 × 0.9 | about 0.05 | 180 (MD) 60 (TD) | 250 (MD) 800 (TD) |
| Example 12 | 30/20 | 50 (talc) | 60 | 3 × 1 | 2.5 × 0.9 | about 0.05 | 190 (MD) 65 (TD) | 280 (MD) 780 (TD) |
| Example 13 | 30/20 | 50 (magnesium hydroxide) | 60 | 3 × 1 | 2.5 × 0.9 | about 0.05 | 120 (MD) 55 (TD) | 180 (MD) 700 (TD) |
| Example 14 | 30/20 | 50 (diatomaceous earth) | 60 | 3 × 1 | 2.5 × 0.9 | about 0.05 | 130 (MD) 60 (TD) | 200 (MD) 750 (TD) |

| | Properties of Stretched Sheet | | | | | |
|---|---|---|---|---|---|---|
| | Initial Tensile Elastic Modulus (kg/cm$^2$) | Permanent Strain (%) | Porosity (%) | Air Permeability (sec/100 cc) | $\overline{D}$ (μ) | Dmax (μ) | Water Pressure Resistance (mm H$_2$O) |
| Example 11 | 260 (MD) 170 (TD) | 20 (MD) 30 (TD) | 37 | 380 | 0.9 | 2.6 | 5500 |
| Example 12 | 350 (MD) 180 (TD) | 25 (MD) 35 (TD) | 28 | 3000 | 0.2 | 0.8 | 12000 |
| Example 13 | 270 (MD) 130 (TD) | 25 (MD) 35 (TD) | 33 | 750 | 0.5 | 1.2 | 9300 |
| Example 14 | 280 (MD) 160 (TD) | 20 (MD) 35 (TD) | 38 | 350 | 0.9 | 2.4 | 5300 |

A composition comprising the same ethylene-butene-1 copolymer as used in Example 1, linear low density polyethylene (LLDPE) (Ultzex-20204 supplied by Mitsui Petrochemical) and a filler selected from the same heavy calcium carbonate as used in Example 1, talc (Micro Ace K-1 supplied by Nippon Talc) having a particle size of 3.3 microns, magnesium hydroxide (Kisuma 5A supplied by Kyowa Chemical) having a particle size of 2 microns and diatomaceous earth (Radiolite F supplied by Showa Chemical) having a particle size of 5 microns in amounts indicated in Table 4 was pelletized at 180° C. by using a biaxial extruder. Incidentally, the same polyester type plasticizer as used in Example 1 was incorporated in an amount of 2% by weight based on the total composition.

The pellet was extruded from a circular die at a resin temperature of 180° C. by using a vent-type extruder having a diameter of 50 mm to obtain a sheet having a thickness of 0.07 mm. The sheet was air-cooled and taken out. Then, the sheet was stretched only in the longitudinal direction (MD) at a stretching ratio of 3 at

We claim:

1. A porous sheet comprising (i) 40 to 80% by weight of an inorganic filler and (ii) 60 to 20% by weight of a polyolefin type thermoplastic elastomer composition comprising at least 50% by weight of a polyolefin type thermoplastic elastomer selected from the group consisting of an ethylene-propylene copolymer, an ethylene-propylene-diene copolymer and an ethylene-butene-1 copolymer, in which the tensile stress at a temperature of 25° C. under 100% stretching (100% modulus) is 10 to 100 kg/cm$^2$, the elongation at break under stretching is at least 100% and the permanent strain under 100% stretching is less than 50% and up to 50% by weight of a thermoplastic polyolefin resin plastomer, said sheet being stretched in at least one direction and having fine communicating pores in the interior thereof, wherein the initial tensile elastic modulus is lower than 500 kg/cm$^2$, the permanent strain after 50% stretching is lower than 50%, the air permeability is lower than 10000 sec/100 cc, the water pressure resistance is at least 1000 mmH$_2$O, the maximum pore size is smaller than 10 microns and the elongation at break is at least 50%.

2. A sheet as set forth in claim 1, wherein the average pore size is 0.05 to 5 microns as measured according to the mercury pressure method.

3. The sheet of claim 1 wherein the polyolefin type thermoplasticl elastomer composition comprises a mixture of an ethylene-butene-1 copolymer having an ethylene content of 85%, a 100% modulus of 60 kg/cm$^2$, an elongation at break of 70%, and a permanent strain after 100% stretching of 5%, and polypropylene having a melt flow index of 4.0.

4. The sheet of claim 3 wherein the weight ratio of the ethylene-butene-1 copolymer of polypropylene is in the rage of from about 4:1 to about 3:2.

5. The sheet of claim 1 in which the polyolefin type thermoplasic elastomer composition comprises a mixture of an ethylene-propylene-diene copolymer having a tensile strength at 25° C. under 100% stretching of 15 kg/cm$^2$, an elongation at break of 1000% and a permanent strain after 100% stretching of 10% and a powdery polypropylene having a melt flow index of 4 at a weight ratio of ethylene-propylene-diene copolymer to powderyl polypropylene of about 35/15.

6. The sheet according to claim 1 wherein the polyolefin type thermoplastic elastomer composition comprises a mixture of an ethylene-butene-1 copolymer and linear low density polyethylene and the inorganic filler is selected from the group consisting of calcium carbonate, talc, magnesium, hydroxide, and diatomaceous earth.

7. The porous sheet of claim 1 wherein the polyolefin type thermoplastic elastomer composition consists substantially of 100% by weight of the polyolefin type thermoplastic elastomer.

8. The porous sheet of claim 1 which is stretched in at least one direction at a stretching ratio of at least 1.5.

* * * * *

UNITED STATES PATENT AND TRADEMARK OFFICE
CERTIFICATE OF CORRECTION

PATENT NO. : 4,613,643
DATED : September 23, 1986
INVENTOR(S) : Shunichi Nakamura, et al.

It is certified that error appears in the above—identified patent and that said Letters Patent is hereby corrected as shown below:

IN THE CLAIMS

Claim 3, line 2, (column 13, line 9),
   delete "thermoplasticl",
   insert --thermoplastic--.

Claim 5, lines 8-9, (column 14, lines 5-6),
   delete "powderyl",
   insert --powdery--.

Signed and Sealed this
Thirtieth Day of December, 1986

Attest:

DONALD J. QUIGG

Attesting Officer     Commissioner of Patents and Trademarks